(12) United States Patent
Foelling (10) Patent No.: US 10,663,707 B2
(45) Date of Patent: May 26, 2020

(54) SCANNING MICROSCOPE (71) Applicant: Leica Microsystems CMS GmbH, Wetzlar (DE)

(72) Inventor: Jonas Foelling, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 37 days.

(21) Appl. No.: 15/536,675

(22) PCT Filed: Dec. 21, 2015

(86) PCT No.: PCT/EP2015/080724
§ 371 (c)(1),
(2) Date: Jun. 16, 2017

(87) PCT Pub. No.: WO2016/097399
PCT Pub. Date: Jun. 23, 2016

(65) Prior Publication Data
US 2017/0351071 A1 Dec. 7, 2017

(30) Foreign Application Priority Data

Dec. 19, 2014 (LU) .......................................... 92620

(51) Int. Cl.
*G02B 21/00* (2006.01)
*G02B 21/36* (2006.01)
(52) U.S. Cl.
CPC ....... *G02B 21/006* (2013.01); *G02B 21/0044* (2013.01); *G02B 21/0064* (2013.01);
(Continued)
(58) Field of Classification Search
CPC .. G02B 21/248; G02B 21/16; G02B 21/0012; G02B 21/0088; G02B 21/24;
(Continued)

(56) References Cited

U.S. PATENT DOCUMENTS 6,878,948 B2 * 4/2005 Knebel ............. G01N 21/6428
250/459.1
7,292,342 B2 * 11/2007 Zaugg .................... B82Y 20/00
356/451
(Continued)

FOREIGN PATENT DOCUMENTS

EP 2253983 A2 11/2010
JP 2001066127 A 3/2001
JP 2010271569 A 12/2010

*Primary Examiner* — William R Alexander
*Assistant Examiner* — Tamara Y. Washington
(74) *Attorney, Agent, or Firm* — Leydig, Voit & Mayer, Ltd.

(57) ABSTRACT

A scanning microscope includes an objective and a scanning element that is adjustable for a time-variable deflection to guide a focused illumination beam across the sample in a scanning movement. A detection beam is guided across sensor elements of an image sensor in a movement which corresponds to the scanning movement of the focused illumination beam. A dispersive element of a predetermined dispersive effect arranged upstream of the image sensor spatially separates different spectral components of the detection beam from one another on the image sensor. A controller detects the time-variable adjustment of the scanning element, assigns the spatially separated spectral components of the detection beam to the sensor elements of the image sensor based on the detected time-variable adjustment, while taking into account the predetermined dispersive effect of the dispersive element, and individually reads out the sensor elements assigned to the spectral components.

17 Claims, 5 Drawing Sheets

(52) U.S. Cl.
CPC ..... *G02B 21/0076* (2013.01); *G02B 21/0084* (2013.01); *G02B 21/361* (2013.01); *G02B 21/367* (2013.01)

(58) Field of Classification Search
CPC ...... G02B 21/02; G01N 21/6458; A61B 3/13; A61B 90/20; A61B 3/12; A61B 3/132; A61B 3/135; Y10S 359/90
USPC .......................... 359/362, 368, 381; 850/9, 21
See application file for complete search history.

(56) References Cited

U.S. PATENT DOCUMENTS

| | | | | |
|---|---|---|---|---|
| 7,304,314 B2* | 12/2007 | Zaugg | .................. | G01J 1/42 250/458.1 |
| 7,315,039 B2* | 1/2008 | Kitagawa | .................. | G01J 3/10 250/578.1 |
| 7,362,420 B2* | 4/2008 | Zaugg | .................. | G01S 17/08 356/4.01 |
| 7,365,842 B2* | 4/2008 | Kitagawa | ........... | G01N 21/6458 356/317 |
| 7,408,637 B2* | 8/2008 | Freeling | .................. | G01J 3/02 356/300 |
| 7,539,308 B2* | 5/2009 | Conti | .................. | H04L 9/0852 380/256 |
| 7,609,382 B2* | 10/2009 | Kastella | ................ | H04B 10/70 356/36 |
| 7,669,469 B2* | 3/2010 | Shammai | ................ | E21B 49/082 436/25 |
| 7,706,694 B2* | 4/2010 | Freeling | ................ | G06N 10/00 398/183 |
| 7,831,048 B2* | 11/2010 | Kastella | .................. | H04L 9/12 380/256 |
| 8,462,336 B2* | 6/2013 | Betzig | ................ | G01N 21/6458 356/317 |
| 8,917,388 B2* | 12/2014 | Tenhunen | ................ | G01J 3/02 356/301 |
| 8,935,127 B2* | 1/2015 | Liedtke | ................ | G01J 3/2889 702/189 |
| 9,070,725 B2* | 6/2015 | Matsudo | ................ | G01K 5/50 |
| 9,784,959 B2* | 10/2017 | Takamizawa | ........ | G02B 21/008 |
| 2002/0020819 A1 | 2/2002 | Wolleschensky et al. | | |
| 2010/0294949 A1 | 11/2010 | Sasaki et al. | | |
| 2012/0257037 A1* | 10/2012 | Raicu | .................. | G02B 21/002 348/79 |
| 2012/0305803 A1* | 12/2012 | Foelling | ............. | G01N 21/6458 250/459.1 |
| 2013/0010098 A1* | 1/2013 | Kalkbrenner | ...... | G01N 21/6428 348/79 |
| 2013/0119273 A1* | 5/2013 | Foelling | ................ | G02B 21/06 250/459.1 |
| 2013/0120539 A1* | 5/2013 | Foelling | ............. | G02B 27/0075 348/49 |
| 2013/0128025 A1* | 5/2013 | Dyba | ................ | G01N 21/6458 348/79 |
| 2014/0061445 A1* | 3/2014 | Foelling | ................ | G02B 21/088 250/214.1 |
| 2016/0063718 A1* | 3/2016 | Foelling | ................ | G01N 21/6458 382/128 |
| 2016/0202463 A1* | 7/2016 | Foelling | ................ | G02B 21/12 250/205 |
| 2016/0370570 A1* | 12/2016 | Foelling | ............. | G02B 27/0025 |
| 2017/0351071 A1* | 12/2017 | Foelling | ............. | G02B 21/0064 |

* cited by examiner

SCANNING MICROSCOPE

CROSS-REFERENCE TO PRIOR APPLICATIONS

This application is a U.S. National Stage Application under 35 U.S.C. § 371 of International Application No. PCT/EP2015/080724 filed on Dec. 21, 2015, and claims benefit to Luxembourg Patent Application No. LU 92620 filed on Dec. 19, 2014. The International Application was published in German on Jun. 23, 2016 as WO 2016/097399 A1 under PCT Article 21(2).

FIELD

The invention relates to a scanning microscope comprising an objective which focuses an illumination beam onto an item, a scanning element which is arranged upstream of the objective and which can be adjusted in order to deflect the illumination beam in a time-variable manner in order to guide the focused illumination beam across the item in a scanning movement, and an image sensor onto which the objective, optionally in connection with further optics, images or focuses a detection beam which emanates from the item which is illuminated by the focused illumination beam.

BACKGROUND

In scanning microscopy, at least one illumination beam is focused by an objective onto a sample. To guide the illumination beam in a scanning or sampling movement across the sample, a scanning element (for example one or more movable mirrors, an AOD, i.e. an acousto-optical deflector, or the like) is arranged upstream of the objective, which scanning element deflects the illumination beam such that this beam performs the required scanning movement on the sample. The scanning element usually comprises one or more mirrors, the tilting movement of which is converted by the optical imaging into a lateral movement of the light spot generated by the illumination beam on the sample. The focused illumination beam thus scans the sample point by point. The detection light emanating from the sample is then detected for each scanned point. Finally, the detection signal thus acquired is composed into an image in a computing unit.

In the field of scanning microscopy, confocal microscopy is a particularly preferred microscopy method. The basic mode of operation of this microscopy method will be explained in the following with reference to FIG. 1 which shows, purely schematically, a confocal microscope which is generally denoted by reference numeral 10.

Figure 1:
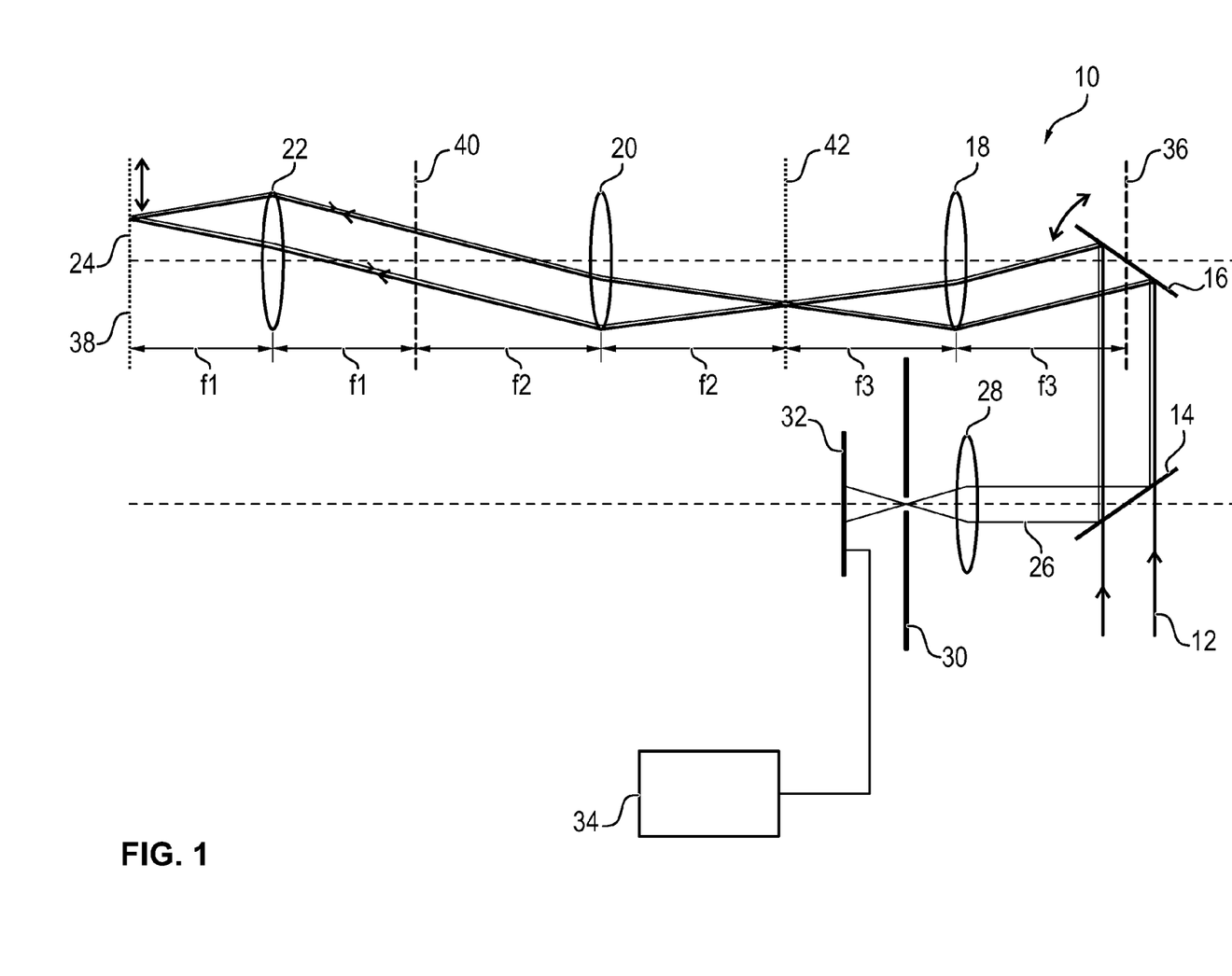
FIG. 1 schematically shows a conventional confocal microscope.

The confocal microscope 10 has a light source which emits an illumination beam 12 onto a dichroitic beam splitter mirror 14. The beam splitter mirror 14 is configured so that it lets through light of the wavelength of the illumination beam 12. The illumination beam 12 thus passes through the beam splitter mirror 14 and strikes a scanning mirror 16. As indicated in FIG. 1 by the double-headed arrow, the scanning mirror 16 can be tilted. The illumination beam 12 is deflected by the tilting movement of the scanning mirror 16 according to the required scanning movement.

After being reflected at the scanning mirror 16, the illumination beam 12 passes through a scanning lens 18 of focal length f3, a tube lens 20 of focal length f2 and an objective 22 of focal length f1. The objective 22 finally focuses the illumination beam 12 onto a sample 24. The focused illumination beam 12 scans the sample 24 point by point by way of the tilting movement of the scanning mirror 16.

A detection beam which is denoted in FIG. 1 by reference numeral 26 and which emanates from a scanned point illuminated by the focused illumination beam 12 arrives back in the objective 22 and passes through the beam path described above in the opposite direction until it strikes the beam splitter mirror 14. Said mirror is configured so that it reflects light of the wavelength of the detection beam 26. The beam splitter mirror 14 thus deflects the detection beam 26 onto a lens 28 which focuses the detection beam 26 onto a confocally arranged pin diaphragm 30. The pin diaphragm 30 filters out of the detection beam 26 all the light originating from regions of the sample 24 which originates outside the light spot generated on the sample 24 by the illumination beam 12. The light which passes through the pin diaphragm 30 finally arrives at an image sensor 32 which can be read out via a controller 34. The light emanating from the sample 24 can thus be detected for each individual scanned point and the detection signal thus generated can be composed into an image.

An essential feature of the confocal microscope 10 according to FIG. 1 in the present context is that the detection beam 26 emanating from the sample 24 is directed back onto the scanning mirror 16, so that the detection beam 26 is influenced by the scanning mirror 16 in the same way as the illumination beam 12. Consequently, the detection beam 26 strikes the image sensor 32 in a stationary manner, while the illumination beam 12 performs a scanning movement on the sample 24 by way of the scanning movement of the scanning mirror 16. The detection beam 26 is held in a quasi stationary manner on the image sensor 32 by way of the return of the detection beam onto the scanning mirror 16. In this context, "stationary" means that although the incidence angle at which the detection beam 26 strikes the image sensor 32 can vary (in the embodiment according to FIG. 1, this incidence angle is stationary), the location of the light incidence cannot.

The principle of holding the detection beam 26 stationary in the sense explained above on the image sensor 32, by way of returning it onto the scanning element 16, is also known in the present technical field as "descanning". In order to allow "descanning" of this type, in the confocal microscope according to FIG. 1, the scanning mirror 16 is arranged in a plane 36 which is an optically conjugate plane with respect to the object plane denoted in FIG. 1 by reference numeral 38. FIG. 1 also shows an intermediate image plane 40 and 42. The intermediate image plane 40 corresponds optically to plane 36 and is optically conjugate with object plane 38. The intermediate image plane 42 corresponds optically to object plane 38 and is optically conjugate with plane 36.

SUMMARY

In an embodiment, the present invention provides a scanning microscope. The scanning microscope includes an objective configured to focus an illumination beam onto a sample. A scanning element is arranged upstream of the objective and is adjustable for a time-variable deflection of the illumination beam to guide the focused illumination beam across the sample in a scanning movement. The objective is configured to image a detection beam which emanates from the sample illuminated by the focused illumination beam onto an image sensor. The image sensor has a plurality of sensor elements across which the detection beam is guidable in a movement which corresponds to the scanning movement of the focused illumination beam. A dispersive element of a predetermined dispersive effect is arranged upstream of the image sensor and is configured to spatially separate different spectral components of the detection beam from one another on the image sensor. A controller is configured to detect the time-variable adjustment of the scanning element for a spectrally resolved detection of the detection beam, assign the spatially separated spectral components of the detection beam to the sensor elements of the image sensor based on the detected time-variable adjustment, while taking into account the predetermined dispersive effect of the dispersive element, and individually read out the sensor elements assigned to the spectral components.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

For many uses in microscopy, the inventor has recognized it is important to allow a variable spectral detection which is as continuous as possible. This means that the detection light can be divided into different detection channels, differentiated according to wavelengths, as arbitrarily as possible. This is necessary, for example, in order to separate from one another as effectively as possible the detection signals arising from the different dyes. Likewise, different conditions can be recognized in the sample by variations in the emission spectrum of a dye. If these variations can be measured by an effectively resolved spectral detection, the user can reconstruct the different conditions in the sample.

Figure 2:
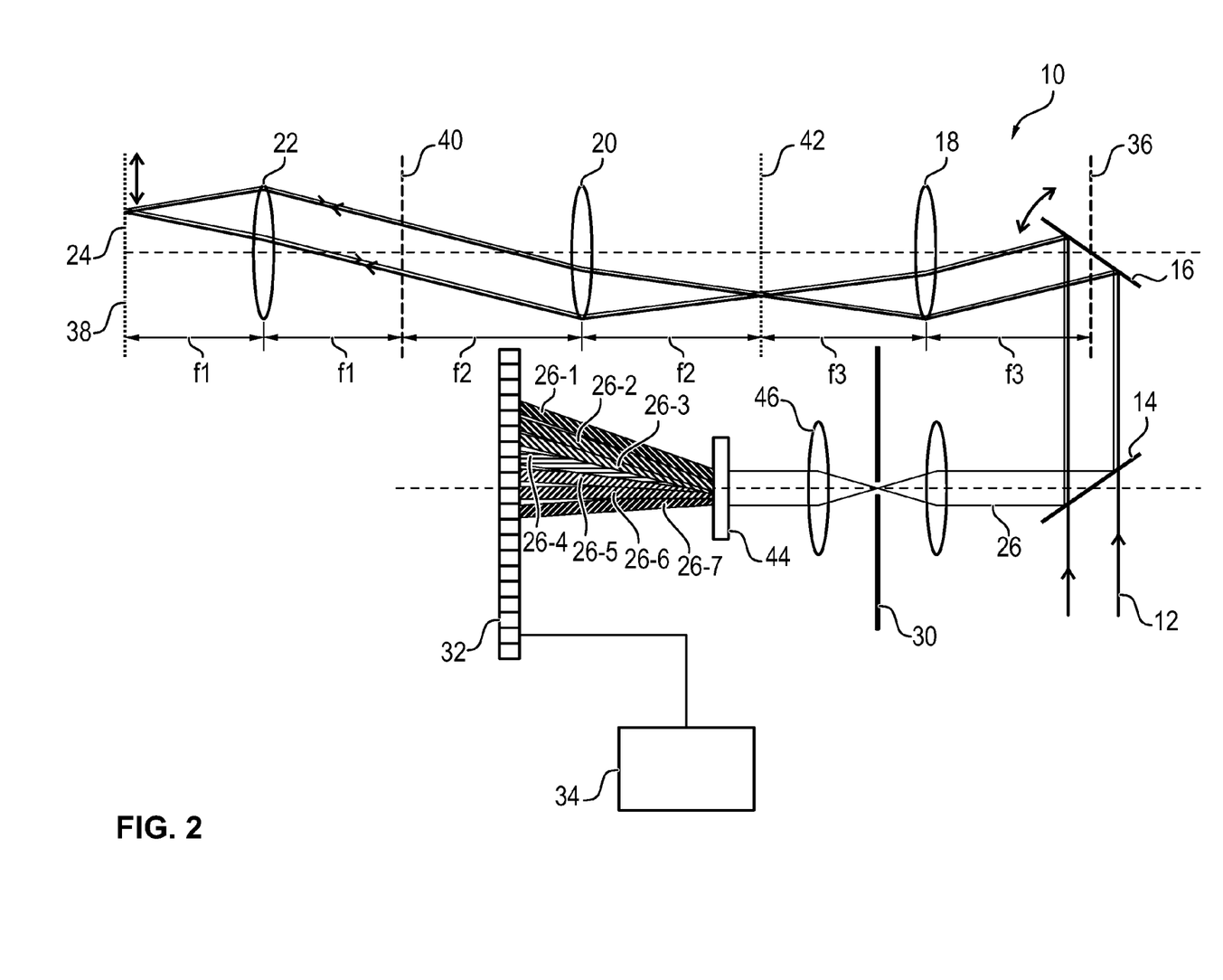
FIG. 2 shows an embodiment of the confocal microscope according to FIG. 1 which has been modified for the purpose of spectral detection.

A spectral detection of this type can be realized relatively easily with a confocal microscope of the type shown in FIG. 1. For this, reference is made to FIG. 2 which shows a modification of the confocal microscope 10 which allows a spectral detection. In the modification according to FIG. 2, provided in the beam path downstream in terms of light of the pin diaphragm 30 is a dispersive element 44 which splits the detection beam 26 into its different spectral components and delivers these components to the image sensor 32. The image sensor 32 has a plurality of sensor elements which can be read out individually by a controller 34. The different spectral components are depicted in FIG. 2 by partial beams 26-1 to 26-7. Arranged upstream of the dispersive element 44 is a converging lens 46 which focuses the detection beam 26, passing through the pin diaphragm 30, onto the dispersive element 44.

The modification according to FIG. 2 makes use of the descanning principle applied in the case of the confocal microscope 10. Since the detection beam 26 leaves the pin diaphragm 30 as a stationary beam, the different spectral components of the detection beam 26 can be easily separated spatially from one another in the manner shown in FIG. 2 by the dispersive element 44, regardless of the scanned point which has just been imaged on the sample 24. For example, using a diaphragm, it is then possible to filter the exact spectral component of interest out of the detection beam 26 and deliver it to the image sensor 32.

Figure 3:
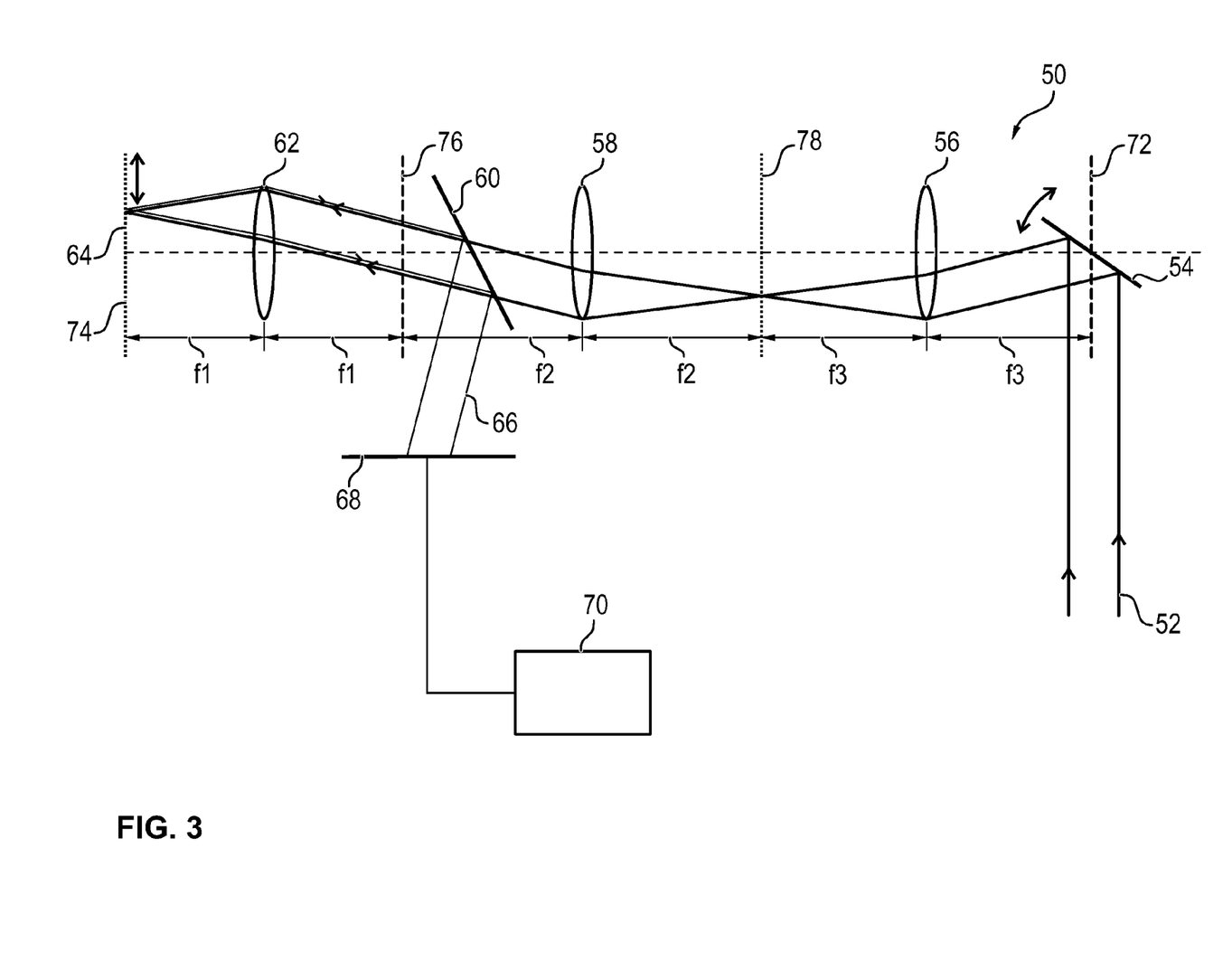
FIG. 3 schematically shows a conventional multiphoton microscope.

It is a different matter for the so-called "non-descanned" principle, as applied to the field of fluorescence microscopy, for example in the case of a multiphoton microscope of the type shown in FIG. 3. FIG. 3 shows a multiphoton microscope 50, in which a light source directs an illumination beam 52 onto a tiltable scanning mirror 54, at which the illumination beam 52 is reflected and then passes through a scanning lens 56 of focal length f3, a tube lens 58 of focal length f2, a dichroitic beam splitter mirror 60 and finally an objective 62 of focal length f1, to be focused on a sample 64. A detection beam 66 which emanates from the sample 64 illuminated by the focused illumination beam 52 passes back into the objective 62 and is then directed by the dichroitic mirror 60 onto an image sensor 68 which is coupled to a controller 70. The scanning mirror 54 is located in a plane 72 which is optically conjugate with an image plane 74 in which the sample 64 is positioned. FIG. 3 shows further planes 76 and 78. Plane 76 is an intermediate image plane which corresponds optically to plane 72 and is optically conjugate with object plane 74. Plane 78 is also an intermediate image plane which corresponds optically to object plane 74 and is optically conjugate with plane 72.

Unlike in the confocal microscope 10 according to FIGS. 1 and 2, in the multiphoton microscope 50, the detection beam 66 is decoupled from the beam path which leads onto the scanning mirror 54 by the dichroitic beam splitter mirror 60 and is delivered directly to the image sensor 70 before it reaches the scanning mirror 54. Accordingly, the detection beam 66 varies in its incidence angle and in its incidence location on the image sensor 70 when the illumination beam 52 performs its scanning movement on the sample 64. Thus, the spectral detection according to FIG. 2 cannot be used with the confocal microscope 50 according to FIG. 3 which operates according to the non-descanned principle.

In an embodiment, the invention provides a scanning microscope of the type mentioned at the outset so that it allows a simple and reliable spectral detection of a detection beam which strikes an image sensor.

According to an embodiment of the invention, provided in the scanning microscope is a dispersive element of a predetermined dispersive effect which is arranged upstream of the image sensor and spatially separates from one another the different spectral components of the detection beam on the image sensor. The controller detects the time-variable adjustment of the scanning element, assigns the spectral components, spatially separated from one another, of the detection beam to the sensor elements of the image sensor on the basis of this adjustment, while taking into account the predetermined dispersive effect of the dispersive element, and reads out the sensor elements assigned to the respective spectral components to allow the spectrally resolved detection of the detection beam.

The solution according to an embodiment of the invention provides the separation of the spatial split of the detection beam which is caused by the spectral separation by the dispersive element, from the spatial movement of the detection beam which is caused by the scanning element. For this purpose, the controller detects the current adjustment of the scanning element, i.e. the tilting angle or angles of a scanning mirror arrangement which forms the scanning element and can be formed from one or more mirrors. The controller also considers the previously known dispersive effect of the dispersive element. Using these two items of information, namely the adjustment of the scanning element and the dispersive effect of the dispersive element, the controller is able at any time to carry out a precise assignment between the sensor elements and the different spectral components of the detection beam which strikes the image sensor. The manner in which the controller detects the time-variable adjustment of the scanning element is not restricted in any way. Thus, for example, it is conceivable that the scanning element itself directly outputs to the controller appropriate information relating, for example, to an angle transmitter. Likewise, however, an individual sensor can also be provided which detects the current adjustment of the scanning element and communicates this to the controller. As far as the previously known dispersive effect of the dispersive element is concerned, this can be kept available, for example, in a memory which is accessed by the controller in order to take the dispersive effect into account in the spectral detection.

The dispersive element is preferably arranged in a plane which is optically conjugate with a plane in which the sample is arranged. The plane in which the dispersive element is arranged is preferably optically equivalent to a plane in which the scanning element is arranged. In the present context, "optically equivalent" means that the two aforementioned planes correspond to one another optically such that the spatial variation of the illumination beam in the location of the scanning element is translated into a corresponding spatial variation of the detection beam in the location of the dispersive element. For example, if the spatial variation of the illumination beam in the location of the scanning element is such that although the illumination beam varies in its incidence angle, it does not vary in its incidence position, then this also applies to the detection beam in the location of the dispersive element, i.e. the detection beam also varies in its incidence angle, but not in its incidence position. If, in this sense, the aforementioned optical equivalence is provided, then it is particularly simple to realize the dispersive element appropriately, since the incidence position of the detection beam on the dispersive element does not change.

The scanning element preferably directs the illumination beam across the sample in a first scanning direction. In this case, the scanning element is, for example, a single mirror which is rotated about a fixed axis to move the illumination beam across the sample preferably in a straight line in the first scanning direction.

The scanning element can also direct the illumination beam across the sample in a second scanning direction which is perpendicular to the first scanning direction, the movement of the illumination beam being faster in the first scanning direction than in the second scanning direction. In this embodiment, the scanning element comprises for example two separate scanning mirrors, of which a first mirror causes the scanning movement in the first scanning direction and the second scanning mirror causes the scanning movement in the second scanning direction. However, it is also possible to provide a single scanning mirror which is moved in both scanning directions. In the following, the scanning direction in which the illumination beam moves faster on the sample than in the other scanning direction will simply be called the fast scanning direction. Accordingly, the other direction will be called the slow scanning direction.

The dispersive effect of the dispersive element is preferably predetermined such that the spectral components of the detection beam are separated spatially from one another on the image sensor in a direction which is perpendicular to a direction in which the detection beam is guided across the image sensor when the illumination beam is guided across the sample in the first scanning direction. Thus, in this embodiment, the plane in which the detection beam is split spectrally by the dispersive element is parallel to the slow scanning direction. As a result of the spectral split, the dispersive element generates a "spectral fan", as it were, in which the spectral information is encoded in angle information. Since the light components of different wavelengths leave the dispersive element at different angles of emergence, the spectral information is thus translated into angle information. Since the vertex of the scanning angle of the scanning element is preferably located in the plane which is optically conjugate with the object plane, the scanning angle is simultaneously superimposed on the angle of the spectral split, based on the slow scanning direction. This means that in this embodiment, the above-mentioned spectral fan tilts backwards and forwards through the scanning angle based on the slow scanning direction. At the same time, the spectral fan also tilts backwards and forwards at the scanning angle based on the fast scanning direction. The tilting movement in the fast scanning direction runs perpendicular to the tilting movement in the slow scanning direction and is thus decoupled therefrom.

In a particularly preferred embodiment, located between the dispersive element and the image sensor is a detection optics which focuses the entire detection beam, split spectrally by the dispersive element, on the image sensor during each adjustment of the scanning element. Since it must be ensured at any point in time that the entirety of the detection beam, which performs a movement on the image sensor which corresponds to the scanning movement of the illumination beam and is also fanned out spatially by the dispersive element, strikes the image sensor, a focusing detection optics of the aforementioned type plays a part in not having the image sensor become too big.

In an embodiment, the detection optics is a lens, the dispersive element being arranged in the focal plane of said lens. An embodiment of this type can be chosen in particular when the image sensor is a surface sensor.

The detection optics can also be configured to focus the spectrally split detection beam onto the image sensor along a predetermined line during each adjustment of the scanning element. In this case, a line sensor can be used as the image sensor.

In a particularly preferred embodiment, the detection optics comprises a crossed arrangement of three cylindrical lenses, the middle cylindrical lens of which has an effectively refractive intersection located in a first plane, while the effectively refractive intersections of the two other cylindrical lenses are located in a second plane perpendicular to the first plane. A cylindrical lens arrangement of this type allows the spectrally split detection beam to be focused particularly easily onto a line sensor, irrespective of the current adjustment of the scanning element.

The controller can be configured to select at least one of the spectral components and to read out only those sensor elements which are assigned to this selected spectral component. This provides a particularly efficient spectral detection.

The dispersive element is, for example, a prism or a grating. However, it is not restricted to embodiments of this type. For example, it is also possible to use an acousto-optic component such as an AOTF as the dispersive element.

The solution according to an embodiment of the invention can be advantageously used in any type of scanning microscope, but particularly in microscopes which operate according to the non-descanned method, i.e. in which the detection beam is decoupled on the image sensor before it reaches the scanning element.

A particularly preferred use is found in multiphoton microscopy, in which in contrast to confocal microscopy, in favor of an improved signal-to-noise ratio, the detection beam is not returned onto the scanning element and then guided through a pin diaphragm. Thus, multiphoton microscopy is often used in highly dispersing samples. Consequently, the detection light is dispersed to such a great extent that it no longer appears to originate from the central focusing region. Nevertheless, this light should be picked up by the image sensor to achieve an improved detection signal.

The invention, in an embodiment, also provides a method for forming an image of a sample by scanning microscopy.

Figure 4:
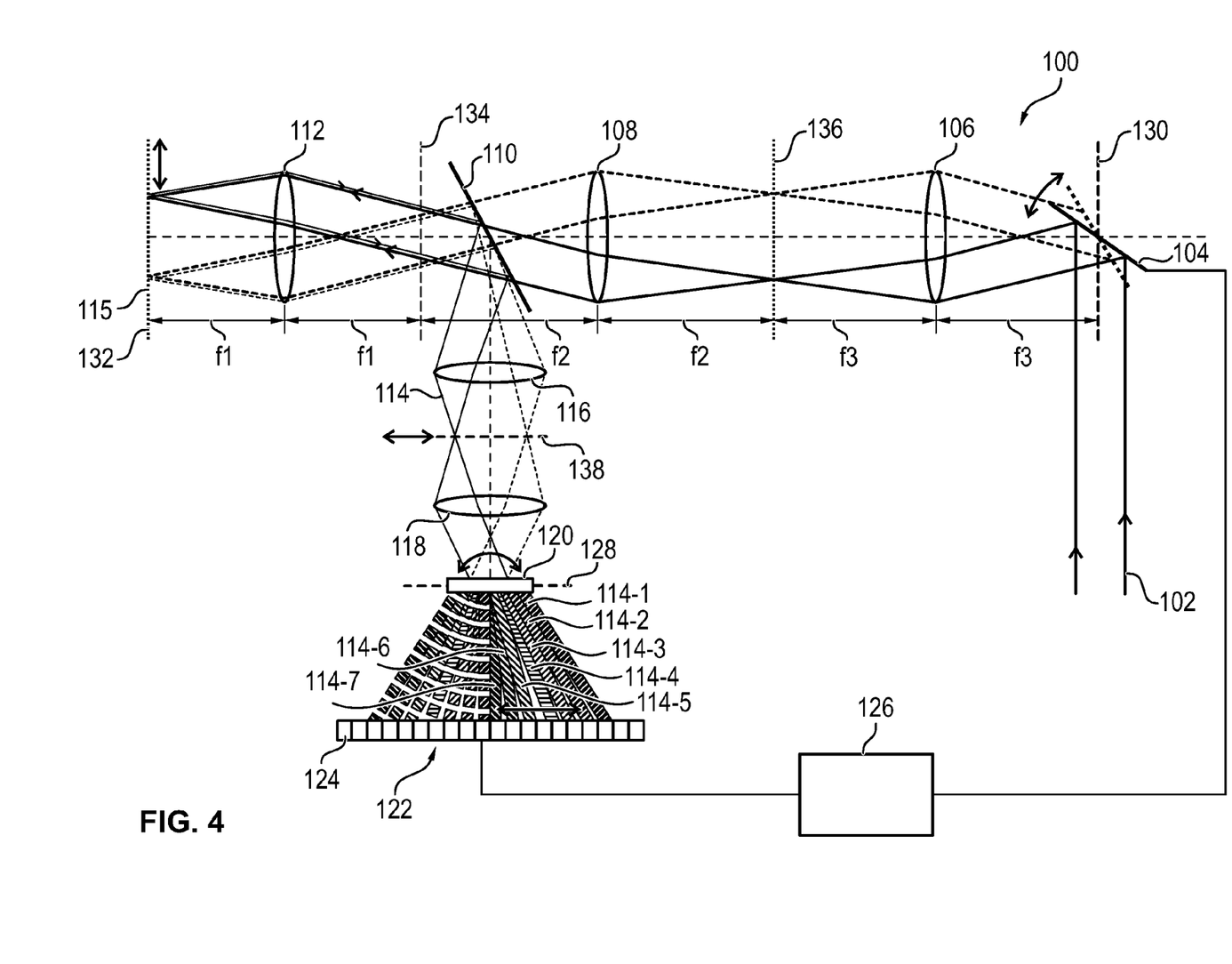
FIG. 4 schematically shows an embodiment of the scanning microscope according to the invention.

FIG. 4 shows purely schematically a scanning microscope 100 which operates according to the non-descanned principle. In the scanning microscope 100, a light source sends an illumination beam 102 onto a scanning mirror 104. As indicated by the double-headed arrow in FIG. 4, the scanning mirror 104 can be tilted to deflect the illumination beam 102 in a variable manner. FIG. 4 shows purely schematically a first tilt position in a solid line and a second tilt position in a dashed line. Accordingly, in the beam path, downstream of the scanning mirror 104 in terms of light, the illumination beam 102 is shown in a solid line for the first tilt position and in a dashed line for the second tilt position.

The illumination beam, reflected on the scanning mirror 104, successively passes through a scanning lens 106 of focal length f3, a tube lens 108 of focal length f2, a dichroitic beam splitter mirror 110 and an objective 112 of focal length f1 which focuses the illumination beam 102 onto a sample 115. According to the two tilt positions of the scanning mirror 104, FIG. 4 shows two scanning points at which the illumination beam 102, focused by the objective 112, respectively converges.

A detection beam 114 which emanates from the sample 115 illuminated by the focused illumination beam 102 passes back into the objective 112, and then strikes the dichroitic beam splitter mirror 110. The dichroitic beam splitter mirror 110 is configured so that it lets through light of the wavelength of the illumination beam or excitation beam 102, but reflects light of the wavelength of the detection beam or fluorescence beam 114. Thus, the detection beam 114 is decoupled from the beam path of the illumination beam 102 in the location of the dichroitic beam splitter mirror 110. Again, the detection beam 114 is shown in FIG. 4 by a solid line and a dashed line for the two tilt positions of the scanning mirror 104.

After being reflected at the dichroitic beam splitter mirror 110, the detection beam 114 passes through two lenses 116, 118 and then strikes a dispersive element 120 which is arranged upstream of an image sensor 122. The image sensor 122 has a plurality of sensor elements 124 which can be read out individually by a controller 126.

The dispersive element 120 is arranged in an intermediate image plane 128 which is optically equivalent to a plane 130 in which the scanning mirror 104 is located. The intermediate image plane 128 is also optically conjugate with an object plane which is designated in FIG. 4 by reference numeral 132 and in which the sample 115 is located. FIG. 4 also shows intermediate image planes 134, 136 and 138. The intermediate image plane 134 is a plane which is optically equivalent to plane 130 and is optically conjugate with object plane 132. Intermediate image plane 136, like intermediate image plane 138, is optically equivalent to object plane 132 and is optically conjugate with plane 130.

Since the intermediate image plane 128 in which the dispersive element 120 is located is optically equivalent to plane 130 in which the scanning mirror 104 is arranged, when the scanning mirror 104 is tilted the detection beam 114 varies only in its incidence angle, but not in its incidence position in the location of the dispersive element 120. The spatial variation of the detection beam 114 in the location of the dispersive element 120 corresponds in this respect to the spatial variation of the illumination beam 102 in the location of the scanning mirror 104. Therefore, the detection beam 114 is stationary in the location of the dispersive element 120.

The dispersive element 120 has a predetermined dispersive effect, with the result that the detection beam 114 is split into its different spectral components. The spectral components are shown in the drawing according to FIG. 4 in the form of partial beams 114-1 to 114-7. Here again, the partial beams 114-1 to 114-7 are shown on the one hand in solid lines and on the other in dashed lines for the two tilt positions of the scanning mirror 104 which are shown in FIG. 4.

As can be seen in the view according to FIG. 4, the partial beams 114-1 to 114-7 form a spectral fan, as it were, in which the spectral information is encoded in angle information. This angle information is provided by the angles at which the different partial beams 114-1 to 114-7 issue from the dispersive element 120 and then impinge on the individual sensor elements 124 of the image sensor 122.

In the embodiment according to FIG. 4, the illumination beam 102 is to scan the sample 115 in two scanning directions which are perpendicular to one another. In this respect, the scanning procedure takes place faster in one direction than in the other direction. The two scanning directions are transformed into two corresponding directions on the image sensor 122. In the following, these corresponding directions are also called scanning directions for the sake of simplicity.

In the embodiment according to FIG. 4, the dispersive element 120 is configured so that the plane in which the detection beam 114 is split spectrally by the dispersive element 120 is located parallel to the slow scanning direction. In this respect, in the drawing according to FIG. 4, the plane of the spectral split is provided by the plane of the drawing. Thus, the spectral fan, consisting of the partial beams 114-1 to 114-7 and formed by the dispersive element 120 moves in the plane of the drawing when the scanning mirror 114 is moved in the slow direction. At the same time, the spectral fan, formed by the partial beams 114-1 to 114-7, tilts perpendicular to the plane of the drawing according to FIG. 4 in the fast scanning direction when the scanning mirror is moved in the fast scanning direction.

To allow a spectrally resolved detection of the detection beam 114, the controller 126 detects the current tilt of the scanning mirror 104 and, while taking into account the predetermined dispersive effect of the dispersive element 120, determines therefrom those sensor elements 124 which are currently receiving a spectral component to be considered of the detection beam 114, in the form of one of the partial beams 114-1 to 114-7. These sensor elements 124 are then read out by the controller 126 at the respective time to detect the considered spectral component of the detection beam 114 at this time.

Figure 5:
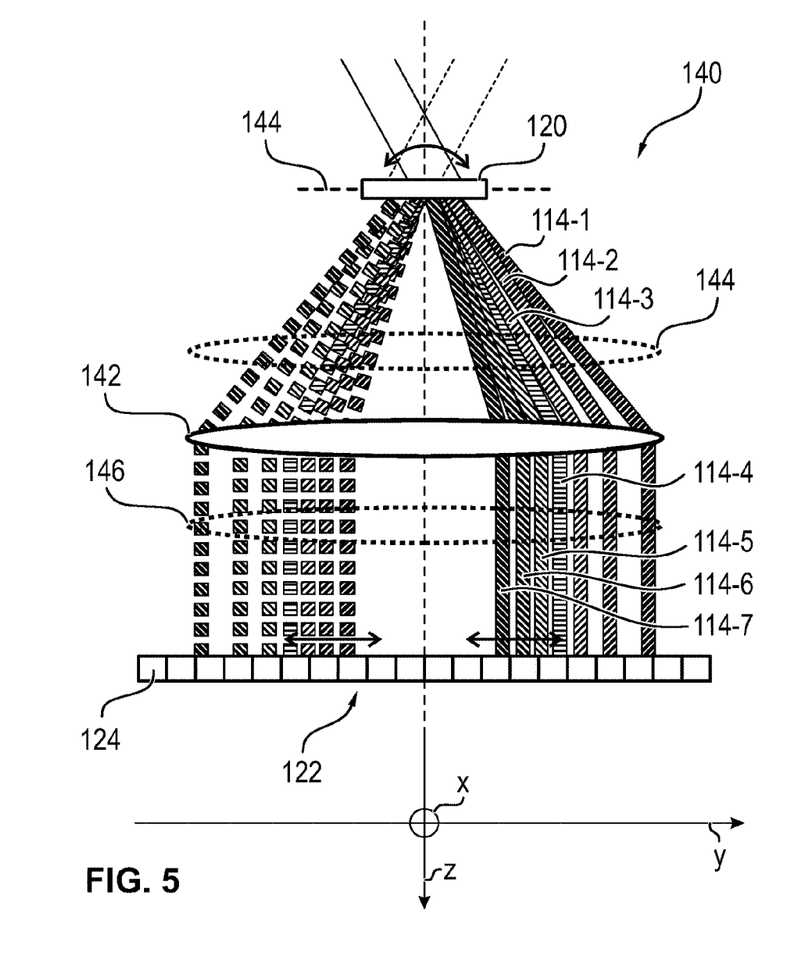
FIG. 5 schematically shows a detection optics in different modifications, which detection optics can be used in the scanning microscope according to the invention.

FIG. 5 shows purely schematically a detection optics 140 which is arranged between the dispersive element 120 and the image sensor 122. The embodiment according to FIG. 4 can be supplemented by the detection optics 140.

In a first embodiment, the detection optics 140 is formed merely from a converging lens 142 which has a focal plane 144. The converging lens 142 focuses the partial beams 114-1 to 114-7, which correspond to the spectral components of the detection beam 114, onto the image sensor 122 in such a way that they strike the image sensor 122 perpendicularly. In the example according to FIG. 5, the detection beam 114, which has been split into the partial beams 114-1 to 114-7 in the x-z plane, moves in the x-direction when the illumination beam 102 scans the sample 115 in the slow scanning direction. In contrast thereto, it moves on the image sensor 122 in the y-direction when the illumination beam 102 scans the sample 115 in the fast scanning direction. In this embodiment, as a result of the movements described above of the detection beam 114, the image sensor 122 is preferably configured as a surface sensor in which the individual sensor elements 124 are arranged in rows (x-direction) and columns (y-direction) in the manner of an array. Since the sensor elements 124 which are arranged in a particular column (y-direction) respectively receive the same spectral components, the signals which are read out from the sensor elements 124 of this column can be integrated during the spectral detection.

Figure 6:
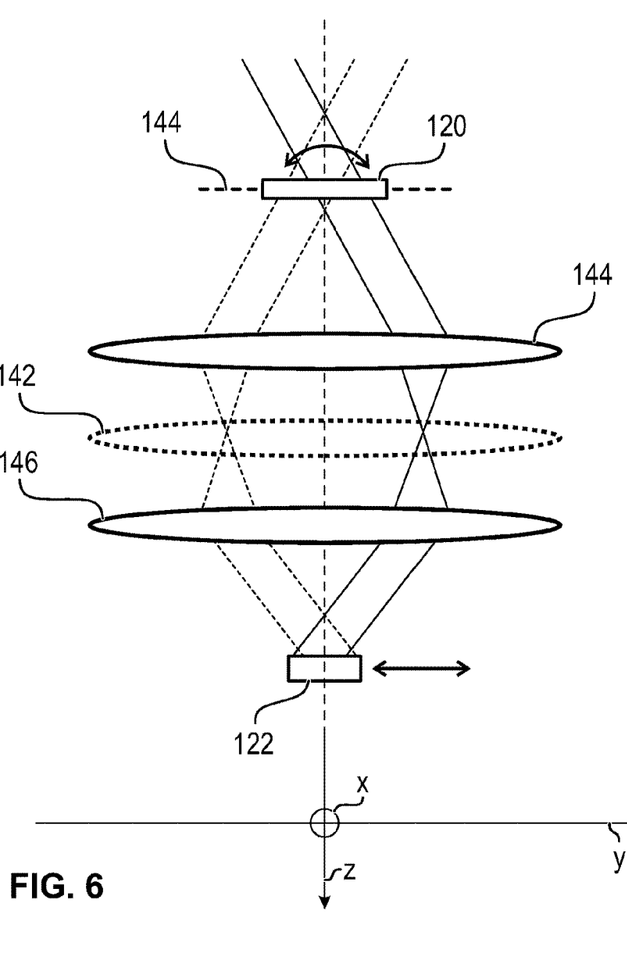
FIG. 6 is a different sectional view of the detection optics according to FIG. 5.

A line sensor can also be used instead of a surface sensor as the image sensor 122. In this case, the detection optics 140 is configured so that it focuses the partial beams 114-1 to 114-7 onto a single line. This can be realized, for example, by an arrangement consisting of three cylindrical lenses. In the following, reference is also made to FIG. 5 for the embodiment. In this case, the lens 142 is configured as a cylindrical lens, which influences the detection beam 114 passing through it in an effectively refractive manner only in the x-z plane. In addition, two further cylindrical lenses 144 and 146 are provided, of which lens 144 is located upstream, in terms of light, and lens 146 is located downstream, in terms of light, of the middle cylindrical lens 142. The cylindrical lenses 144 and 146 are arranged with their cylinder axes perpendicular to the middle cylindrical lens 142. Accordingly, the cylindrical lenses 144 and 146 influence the detection beam 114 passing through them in an effectively refractive manner only in the y-z plane, as is shown by the drawing of FIG. 6, which shows a y-z section through the detection optics 140. Thus, in FIGS. 5 and 6, the lenses which are respectively shown in dashed lines act only on the axis oriented perpendicular to the plane of the drawing. An appropriate choice of the lens spacings makes it possible for the detection beam 114 which passes through this crossed arrangement of the cylindrical lenses 142, 144, 146, to still vary only in its incidence angle, but not in its incidence position, in the y-direction. This makes it possible to use a line sensor, i.e. a single-line detector, which detects the entire amount of light at any point in time While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for forming an image of a sample by scanning microscopy, the method comprising:
    focusing, by an objective, an illumination beam onto the sample,
    adjusting a scanning element arranged upstream of the objective for a time-variable deflection of the illumination beam to guide the focused illumination beam across the sample in a scanning movement,
    focusing, by the objective onto an image sensor, a detection beam which emanates from the sample illuminated by the focused illumination beam, the image sensor having a plurality of sensor elements which are individually readable by a controller,
    guiding the detection beam across the sensor elements in a movement which corresponds to the scanning movement of the focused illumination beam,
    spatially separating different spectral components of the detection beam on the image sensor from one another using a dispersive element of a predetermined dispersive effect which is arranged upstream of the image sensor,
    detecting, by the controller, the time-variable adjustment of the scanning element for a spectrally resolved detection of the detection beam,
    assigning the spatially separated spectral components of the detection beam to the sensor elements of the image sensor based on the detected time-variable adjustment, while taking into account the predetermined dispersive effect of the dispersive element, and
    reading out respective spectral components from the sensor elements assigned to the respective spectral components.

2. The method according to claim 1, wherein the dispersive element is arranged in a plane which is optically conjugate with a plane in which the sample is arranged.

3. The method according to claim 2, wherein the plane in which the dispersive element is arranged is optically equivalent to a plane in which the scanning element is arranged.

4. The method according to claim 1, wherein the scanning element is configured to guide the illumination beam across the sample in a first scanning direction.

5. The method according to claim 4, wherein the scanning element is further configured to guide the illumination beam across the sample in a second scanning direction which is perpendicular to the first scanning direction, the movement of the illumination beam in the first scanning direction being faster than in the second scanning direction.

6. The method according to claim 4, wherein the dispersive effect of the dispersive element is predetermined such that the spectral components of the detection beam on the image sensor are spatially separated from one another in a direction which is perpendicular to a direction in which the detection beam is guided across the image sensor while the illumination beam is guided across the sample in the first scanning direction.

7. The method according to claim 1, further comprising a detection optics is arranged between the dispersive element and the image sensor and configured to focus the entire detection beam, which has been split spectrally by the dispersive element, onto the image sensor during each adjustment of the scanning element.

8. The method according to claim 7, wherein the detection optics is a lens, the dispersive element being arranged in the focal plane of the lens.

9. The method according to claim 7, wherein the detection optics is configured to focus the spectrally split detection beam onto the image sensor along a predetermined line during each adjustment of the scanning element.

10. The method according to claim 9, wherein the detection optics comprises a crossed arrangement of three cylindrical lenses including a middle cylindrical lens and two other cylindrical lenses, the middle cylindrical lens having an effectively refractive intersection which is located in a first plane and the two other cylindrical lenses having effectively refractive intersections located in a second plane which is perpendicular to the first plane.

11. The method according to claim 1, wherein the controller is configured to select at least one of the spectral components and read out only the sensor elements which are assigned to the at least one selected spectral component.

12. The method according to claim 1, wherein the image sensor is a surface sensor or a line sensor.

13. The method according to claim 1, wherein the dispersive element is a prism or a grating.

14. The method according to claim 1, wherein the scanning microscope is configured for the spectrally resolved detection of the detection beam in a non-descanned method.

15. A scanning microscope comprising:
an objective configured to focus an illumination beam onto a sample;
a scanning element which is arranged upstream of the objective and is adjustable for a time-variable deflection of the illumination beam to guide the focused illumination beam across the sample in a scanning movement;
an image sensor onto which the objective is configured to image a detection beam which emanates from the sample illuminated by the focused illumination beam, the image sensor having a plurality of sensor elements across which the detection beam is guidable in a movement which corresponds to the scanning movement of the focused illumination beam,
a dispersive element of a predetermined dispersive effect arranged upstream of the image sensor and configured to spatially separate different spectral components of the detection beam from one another on the image sensor; and
a controller configured to detect the time-variable adjustment of the scanning element for a spectrally resolved detection of the detection beam, assign the spatially separated spectral components of the detection beam to the sensor elements of the image sensor based on the detected time-variable adjustment, while taking into account the predetermined dispersive effect of the dispersive element, and individually read out the sensor elements assigned to the spectral components.

16. A scanning microscope, comprising:
an objective configured to focus an illumination beam onto a sample;
a scanning element which is arranged upstream of the objective and is adjustable for a time-variable deflection of the illumination beam to guide the focused illumination beam across the sample in a scanning movement;
an image sensor onto which the objective is configured to image a detection beam which emanates from the sample illuminated by the focused illumination beam, the image sensor having a plurality of sensor elements across which the detection beam is guidable in a movement which corresponds to the scanning movement of the focused illumination beam,
a dispersive element of a predetermined dispersive effect arranged upstream of the image sensor and configured to spatially separate different spectral components of the detection beam from one another on the image sensor; and
a controller configured to detect the time-variable adjustment of the scanning element for a spectrally resolved detection of the detection beam, assign the spatially separated spectral components of the detection beam to the sensor elements of the image sensor based on the detected time-variable adjustment, while taking into account the predetermined dispersive effect of the dispersive element, and individually read out the sensor elements assigned to the spectral components,
wherein the scanning element is configured to guide the illumination beam across the sample in a first scanning direction, and
wherein the scanning element is further configured to guide the illumination beam across the sample in a second scanning direction which is perpendicular to the first scanning direction, the movement of the illumination beam in the first scanning direction being faster than in the second scanning direction.

17. A scanning microscope, comprising:
an objective configured to focus an illumination beam onto a sample;
a scanning element which is arranged upstream of the objective and is adjustable for a time-variable deflection of the illumination beam to guide the focused illumination beam across the sample in a scanning movement;
an image sensor onto which the objective is configured to image a detection beam which emanates from the sample illuminated by the focused illumination beam, the image sensor having a plurality of sensor elements across which the detection beam is guidable in a movement which corresponds to the scanning movement of the focused illumination beam,
a dispersive element of a predetermined dispersive effect arranged upstream of the image sensor and configured to spatially separate different spectral components of the detection beam from one another on the image sensor;

a controller configured to detect the time-variable adjustment of the scanning element for a spectrally resolved detection of the detection beam, assign the spatially separated spectral components of the detection beam to the sensor elements of the image sensor based on the detected time-variable adjustment, while taking into account the predetermined dispersive effect of the dispersive element, and individually read out the sensor elements assigned to the spectral components; and a detection optics arranged between the dispersive element and the image sensor and configured to focus the entire detection beam, which has been split spectrally by the dispersive element, onto the image sensor along a predetermined line during each adjustment of the scanning element, the detection optics comprising a crossed arrangement of three cylindrical lenses including a middle cylindrical lens and two other cylindrical lenses, the middle cylindrical lens having an effectively refractive intersection which is located in a first plane and the two other cylindrical lenses having effectively refractive intersections located in a second plane which is perpendicular to the first plane.

* * * * *